June 2, 1964 A. J. WILTSHIRE Re. 25,587

METHOD AND APPARATUS FOR FORMING FIBER REINFORCED TUBES

Original Filed Oct. 16, 1958 3 Sheets-Sheet 1

INVENTOR.
ARTHUR J. WILTSHIRE

BY
RICHEY, McNENNY & FARRINGTON
Donald W. Farrington
ATTORNEYS

METHOD AND APPARATUS FOR FORMING FIBER REINFORCED TUBES

Original Filed Oct. 16, 1958 3 Sheets-Sheet 2

INVENTOR.
ARTHUR J. WILTSHIRE
BY
RICHEY, McNENNY & FARRINGTON
Donald W. Farrington
ATTORNEYS

METHOD AND APPARATUS FOR FORMING FIBER REINFORCED TUBES

Original Filed Oct. 16, 1958 3 Sheets-Sheet 3

INVENTOR.
ARTHUR J. WILTSHIRE

BY
RICHEY, McNENNY & FARRINGTON
Donald W. Farrington
ATTORNEYS

United States Patent Office

Re. 25,587
Reissued June 2, 1964

25,587

METHOD AND APPARATUS FOR FORMING FIBER REINFORCED TUBES

Arthur J. Wiltshire, Richmond Heights, Ohio, assignor to White Sewing Machine Corporation, Lakewood, Ohio, a corporation of Delaware Original No. 3,012,922, dated Dec. 12, 1961, Ser. No. 767,566, Oct. 16, 1958. Application for reissue May 7, 1962, Ser. No. 193,660
18 Claims. (Cl. 264—114)

Matter enclosed in heavy brackets [ ] appears in the original patent but forms no part of this reissue specification; matter printed in italics indicates the additions made by reissue.

This invention relates to cylindrical tubes comprising [fiber glass] *filament reinforcing* and a bonding agent, and more particularly to an improved tube of this type and methods and apparatus for forming the same.

I am aware that it has previously been suggested to form tubes of this general type in various ways such as winding layers of fiber glass mat around a mandrel, and telescoping layers of fiber glass mat within a rotatable tubular mold.

Forming tubes by winding fiber glass mat about a mandrel results in an uneven wall thickness at the overlap or joint. The same is true when layers of fiber glass mat are telescoped within a cylindrical mold which is subsequently rotated to compact the fiber glass but in this method another undesirable characteristic is introduced particularly if a relatively thick walled tube is desired. Those skilled in the art will appreciate that when a mat is rolled to provide several mat layers in the wall structure and such a roll is subjected to centrifugal compacting, a stretching and pulling occurs as the diameter of the layers is changed and frequently to a degree that a complete break-down in the continuity of the mat results. When a bonding resin is introduced to such a rolled mat structure having a break in one or more layers, the void caused by the break is filled with liquid resin and the finished product is subject to failure under low stress at such voids.

Apart from the above objections to the use of rolled fiber glass mat in forming tubes, a uniform hoop strength cannot be achieved due to inherent characteristics of the mat. First, about five to ten percent of binder by weight is used in the production of fiber glass mat and this binder interferes with wet-out or the ability of the bonding agent or liquid resin to uniformly distribute through the layers of mat resulting in voids in the finished tube. Second, the weight of mat over a large area varies considerably and the usual tolerances are plus or minus twenty percent which means that different portions of the mat could vary as much as forty percent in weight. Of course, this variation in mat weight causes variation in strength of the finished product.

Since the amount of binder used in forming fiber glass strands is less than the amount used in mats, numerous attempts have been made to substitute for the rolled mat method an arrangement wherein chopped fibers are introduced to a rotating mold to compact the same and achieve a desired wall thickness. The introduction of chopped fibers by blowing or otherwise presented control problems due to the volume of air required to move the chopped fibers from their source to the interior of the mold.

According to the present invention, I provide apparatus wherein continuous [glass] filaments or strands, *preferably glass,* are introduced to a rotating mold and such filaments are chopped at the interior of the mold and are evenly distributed by the apparatus to build up a uniform compact wall. The rolled mat is dispensed with and there is no necessity for the manufacturer to inventory a number of different sizes and weights of mat product.

It is among the objects of my invention to provide a method of making a tubular [fiber glass] *filament reinforced plastic* article wherein [glass] *reinforcing* filaments are introduced to the interior of a rotating mold and such filaments are chopped into short lengths immediately adjacent the interior wall of the mold and wherein the point of introduction of the [fibers] *filaments* to the mold is progressively traversed fore and aft along the axis of the mold to evenly distribute the chopped [fibers] *filaments* as the mold is being rotated.

It is a further object of my invention to provide an apparatus wherein a tubular mold is supported for rotation at each end thereof and one end of the mold is open to receive a reciprocating feeder head which head leads continuous [fiber glass] filaments into the interior of the mold and wherein such filaments are chopped into short lengths and are held against the wall of the mold by centrifugal force.

It is a further object of my invention to provide an apparatus according to the preceding object wherein the bearing supports for the rotating mold include a large diameter entrance at one end of the mold whereby [fiber glass] *filament* chopping and feeding mechanism may be readily traversed along the length of the mold.

It is a further object of my invention to provide an apparatus according to the preceding object wherein the traversing head for introducing the [fiber glass] *filament* to the mold carries a liquid spray apparatus so that either resin or solvent may be introduced to the mold at the same time and in the same area as the chopped [fiber glass is] *filaments* are introduced to the mold.

Further objects and advantages relating to economies of manufacture, high speed operation and an improved tubular product will appear from the following description and the appended drawings wherein.

Figures 1, 1A, 1B:
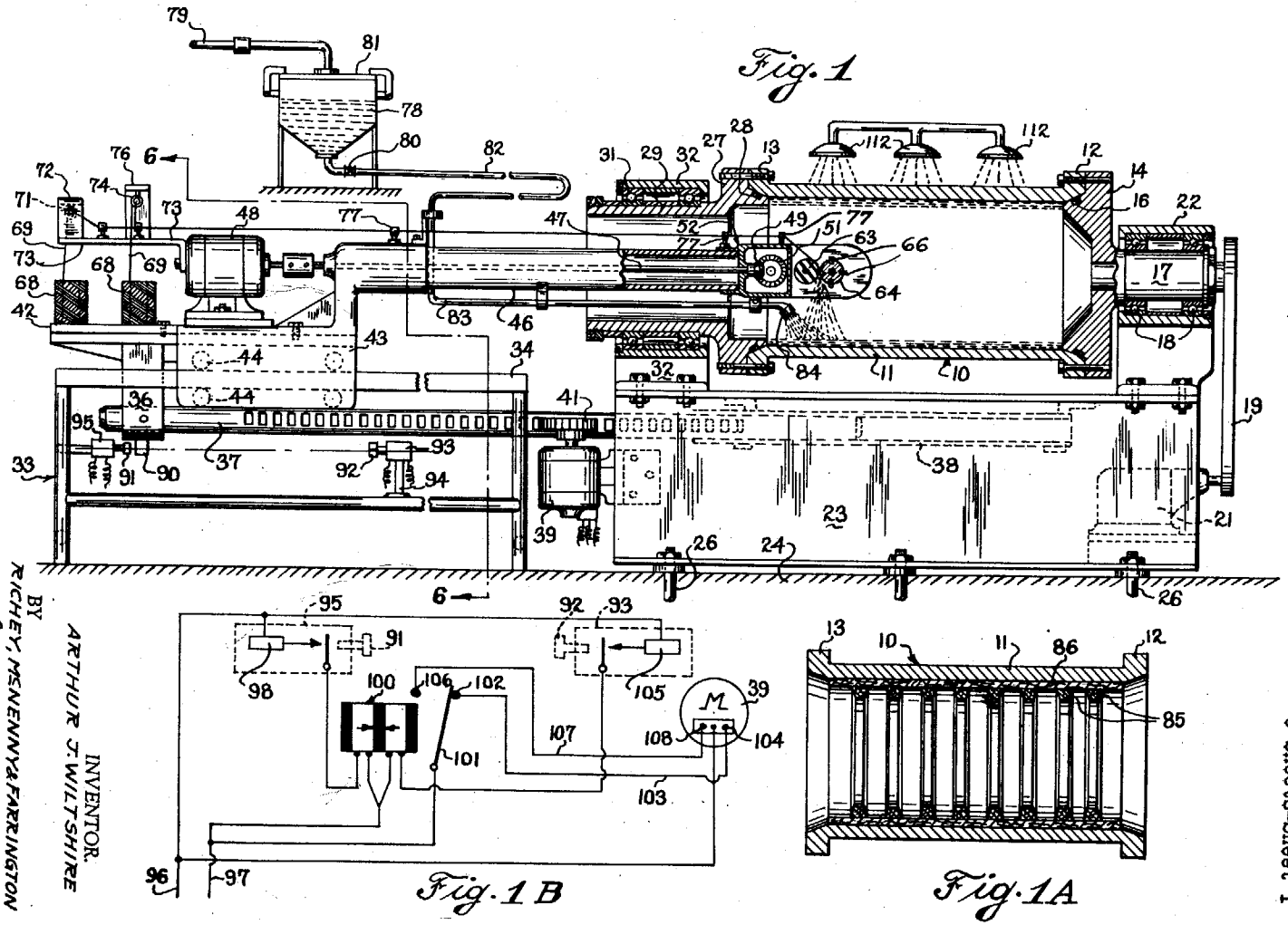
FIG. 1 is an elevation with parts in section showing the apparatus for making tubular [fiber glass] *filament reinforced plastic* articles according to my invention.
FIG. 1A is a sectional view of a reinforced tubular structure adapted to be made in the apparatus of this invention.
FIG. 1B is a wiring diagram for the reversing mechanism forming a part of my invention.
Figure 2:
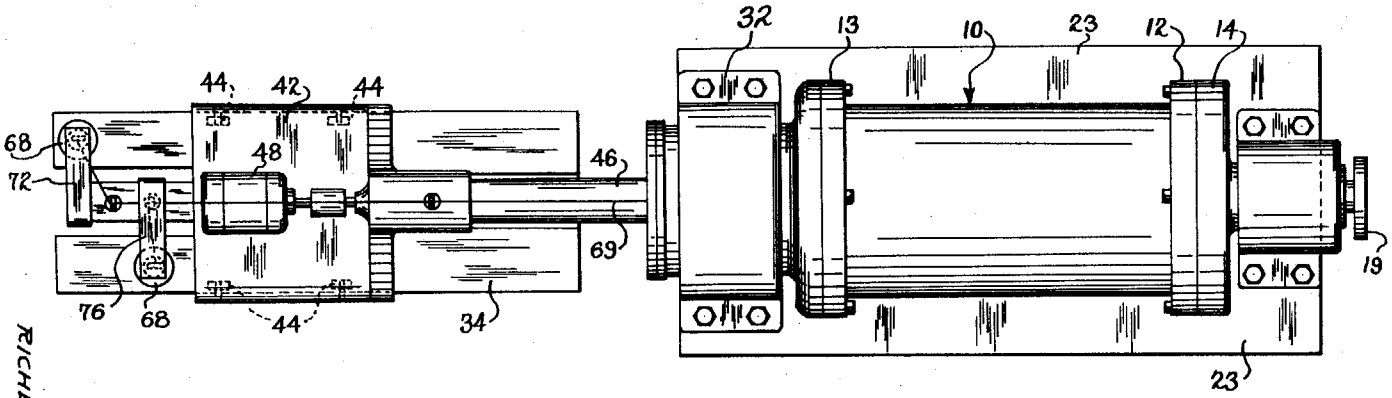
FIG. 2 is a plan view of the apparatus of FIG. 1.
Figure 3:
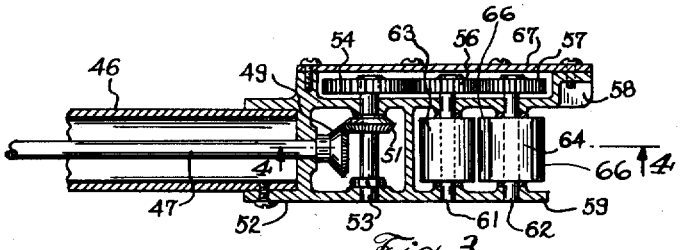
FIG. 3 is an enlarged showing with parts in section of the chopping mechanism for cutting the [glass] filaments at the interior of the mold.
Figure 4:
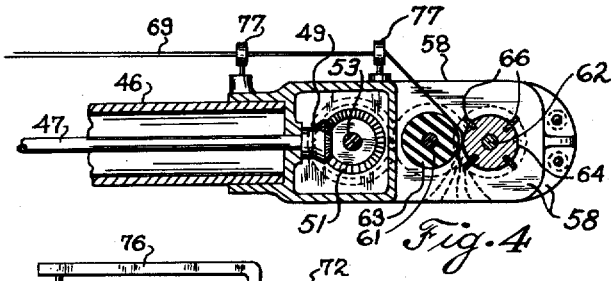
FIG. 4 is an elevation with parts in section as indicated at 4—4 of FIG. 3.
Figure 5:
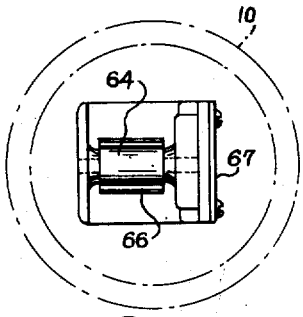
FIG. 5 is an end view of the glass feeding head with the mold opening shown in phantom outline.
Figure 6:
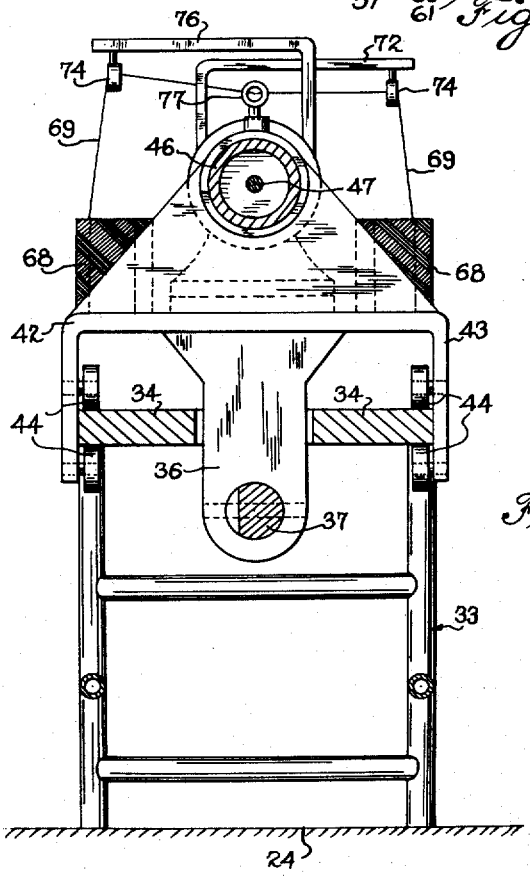
FIG. 6 is a sectional view taken along the plane indicated at 6—6 of FIG. 1.

Referring now to the drawings, particularly FIGS. 1 and 2, I have indicated generally at 10 a rotatable mold or spinning mandrel having a cylindrical wall 11 terminating in outwardly extending flanges 12 and 13. Bolted to flange 12 is a driving head 14 which carries an O-ring or similar seal 16 in an inclined face which engages a similar face on mold 10. Head 14 has a shaft 17 journalled in bearings 18 which is rotatable by a belt 19 driven from a main electric motor 21. Bearings 18 are mounted in a housing 22 secured to a bed plate 23 which is firmly anchored to a concrete or the like base 24 by lag bolts 26. At the opposite end of mandrel 10 a driven head 27 provided with a seal 28 is bolted thereto, head 27 has a relatively large tubular extension 29 which is journalled in bearings 31 mounted in a housing 32 secured to bed plate 23.

Also fixed to base 24 is a tubular frame 33 having a slotted top 34 through which a bracket 36 depends from the carriage 42. Bracket 36 is fixed to one end of a rack 37 which has its opposite end portion slidably mounted in a tube 38 carried centrally of the bed plate 23. A reversible electric motor 39 is fixed to the bed plate and drives a pinion 41 engaging teeth on rack 37 whereby the rack may be reciprocated in the tube 38. Bracket 36 is secured to a carriage 42 having side flanges 43 provided with rollers 44 engaging the upper and lower surfaces of top 34 whereby the table is also supported for reciprocation.

The carriage 42 is provided with a tubular extension 46 which forms a housing for a shaft 47 coupled to an electric motor 48 also mounted on the carriage. The end of shaft 47 remote from the motor is provided with a bevel pinion 49 adapted to drive a bevel gear 51. A gear case 52 supported at the end of extension 46 encloses the pinion and gear and one wall of the gear case 52 provides a bearing for shaft 47. Side walls of the gear case provide journal support for a shaft 53 (FIG. 3) fixed to bevel gear 51. Referring to FIGS. 3 to 6, inclusive, shaft 53 projects through a side wall of gear case 52 to drive a spur gear 54 which engages a gear 56 adapted to drive a gear 57. The gear case 52 includes spaced arms 58 and 59 which provide bearings for shafts 61 and 62. Mounted on the shaft 61 which is fixed to gear 56 and between arms 58 and 59 is a rubber or the like roller 63 proportioned to make pressure contact with a metal roller 64 mounted on shaft 62 which is fixed to gear 57. Roller 64 has a plurality of knives or cutting blades 66 inserted therein adapted to cut or break fiber glass strands or filaments passing between the rollers. The cut pieces of fiber glass fall by gravity onto the inside surface of mandrel 10, as shown in FIG. 1. To form a housing for gears 54, 56 and 57 housing 52 is provided with a rectangular side flange to which a cover plate 67 is secured.

Referring to FIGS. 1, 2, 4 and 6, one or more fiber glass cake 68 (two being shown) are mounted on spindles fixed to carriage 42 whereby fiber glass strands indicated at 69 may be drawn from the cakes. It is common practice to supply fiber glass in the form of roving cakes whereby 60 ends or strands of fiber glass comprising a plurality of filaments called a roving is wound around a tube. In the present case I prefer to use an end comprising 204 filaments. The individual filaments are .0003 inch in diameter. The roving 69 from the left-hand cake 68 (FIG. 1) is fed through an eye 71 depending from an L-shaped bracket 72 supported by an arm 73 extending from motor 48. In a similar manner the roving 69 from the right-hand cake 68 (FIG. 1) is fed through an eye 74 depending from a bracket 76 also supported by arm 73. Both fiber glass ends 69 are then fed through a series of guide eyes 77 to rollers 63 and 64. The fiber glass ends are characterized by a thin coating of polyvinyl acetate or similar binder which is employed to hold the individual elements in a strand form. Since the mass of chopped [fibers] *filaments* in the mandrel will pack more readily and for a more dense mass if this binder material is eliminated or softened, acetone is used to dissolve the polyvinyl acetate.

Referring to FIG. 1, I have indicated at 78 a tank adapted to contain a liquid resin. I preferably use a polyester resin although any suitable thermosetting resin may be used as a bonding agent. Air under pressure is supplied to the tank from a pipe 79 connected to a detachable cover 81. Leading from the tank base is a flexible conduit 82 which is coupled to a rigid conduit 83 fixed to extension 46. A spray nozzle 84 is connected to the forward end of conduit 83 and is disposed adjacent the open end of mandrel 10 or in a position to insure that resin is supplied to the end of the mandrel with the carriage 42 in retracted position as illustrated in FIG. 1. In certain cases it may be desirable to supply a liquid solvent such as acetone to the fiber glass for softening the binder prior to supplying resin to the fiber glass and in that event I provide a second tank and conduit system similar to the resin supply system whereby the solvent can be independently sprayed through a second nozzle 84.

The reciprocation of the carriage 42 is effected by the reversible motor 39. Depending from the underside of the member 36 which connects the carriage 42 to the rack 37 is a lug 90 arranged to strike a button 91 at one end of the carriage travel and a button 92 at the other end of the carriage travel. A switch box 93 is mounted so as to maintain the button 92 in the path of the lug 90 as the carriage reaches the end of its advancing stroke. The box 93 is carried on support 94 and is adjustably mounted on the cross-brace of the supporting structure for the carriage. Thus the stroke of the reciprocating carriage 42 can be varied within limits as determined by the mounting of the member 94. A switch box 95 maintains the button 91 in the path of the lug 90. As indicated in FIG. 1B, the electric power for the motor is introduced by lines 96 and 97. When the lug 90 strikes the button 91 and closes the switch 98, one side of the reversing relay indicated at 100 is effective to reverse the direction of the field windings in motor 39. For example, line 97 leads to a switch member 101 bearing on contact 102 and thence through line 103 to the motor terminal 104. When the lug 90 strikes the button 92 the switch 105 is closed and this is effective to energize the reversing relay 100 so as to swing the member 101 over against contact 106 and thence the current through line 97 is transmitted through switch 101, contact 106, line 107 and thence to the other field winding motor terminal 108. In this manner the [fiber glass] *filament* cutter head assembly is reciprocated within the mandrel 10 concurrently with the rotation of the mandrel 10 and it is possible to deposit an even compact layer of chopped [fibers] *filaments* on the interior of the mandrel.

The manner of employing the apparatus described will now be explained. The fiber glass roving 69 is fed between cutting rollers 63 and 64 as illustrated in FIG. 1. Motors 21, 39 and 48 are energized whereby mandrel 10 rotates, rollers 63 and 64 rotate and at the same time are moved from left to right (FIG. 1) through the mandrel. Mandrel 10 preferably has a highly polished inner wall to give a smooth surface to the finished tube and its speed of rotation may be varied for different tube diameters. Sufficient centrifugal force is generated to tightly compact the chopped fiber glass *filaments* and insure that the liquid resin is transmitted through the fiber glass *filaments* to the mandrel inner wall with sufficient force to remove any air. Of course, as the tube diameter increases the rotational speed of the mandrel can be decreased and for a tube having an external diameter of 16 inches I have found that a mandrel speed of 800 r.p.m. is satisfactory. I preferably space the roller cutting knives 66 to chop the fiber glass *filaments* into about two inch lengths.

During rotation of mandrel 10 a valve 80 in conduit 82 is opened whereby liquid resin will be sprayed from nozzle 84 and directed toward the mandrel inner wall and against the chopped fiber glass *filaments* disposed against the wall of the mandrel.

The tubular [fiber glass] *filament reinforced plastic* structure is cured within the mandrel during the rotation thereof by means of the infra-red heat units 112 arranged adjacent the mandrel. Accordingly the tubular structure is cured under heat and pressure wherein the pressure is that resulting from the centrifugal force due to rotation of the mandrel and the heat is supplied by the infra-red ray units.

In connection with that form of the tubular structure shown in FIG. 1A, it is desirable to compact the chopped fiber glass unit within the mandrel prior to the application of resin. This is accomplished by introducing acetone through a spray unit such as 83—84 where acetone is directed into the mandrel before any resin is supplied. The acetone dissolves the binder which is present in the strands of fiber glass. During the rotation of the mandrel the acetone solvent is evaporated by means of the heat applied in infra-red lamps 112. While the acetone is being evaporated and exhausted from the mandrel, a higher speed of rotation is imparted to the mandrel so as to compact the glass. After the solvent is evaporated the mandrel 10 is removed from the apparatus and individual supporting rings 85 are inserted within the mandrel. Preferably such rings are wound of a continuous fiber glass strand so as to form a reinforcing hoop within the tubular structure. Such rings are preferably resin-bonded during the winding and are cured prior to insertion within the tubular structure 86. Thereafter the mandrel is again mounted in the apparatus and resin is introduced as heretofore described. The rings 85 are thus effectively bonded to the tubular structure 86 and the entire unit is cured by heat and pressure as heretofore described.

The internally reinforced structure illustrated in FIG. 1A is particularly useful for tubes designed to resist high external pressure such, for example, as 1000 pounds per square inch.

It will now be understood that I have disclosed a method and apparatus for supplying a continous strand or end of fiber glass *or other suitable filamentary material* to a rotating mandrel or mold, choping the [fiber glass] *strand* into short lengths within the mold, feeding the chopped [fiber glass] *filaments* back and forth along the length of the mold and compacting the same into a wall of desired thickness by centrifugal force, and concurrently or subsequently feeding a heat hardenable resin to the mandrel wall in the same area where the chopped [fiber glass is] *filaments are* being deposited.

Although I have shown and described two forms of tubular structure made by my apparatus and have described the apparatus and method of making the structure in considerable detail, it will be understood by those skilled in the art that numerous modifications may be made in the apparatus and in the method of making the article without departing from the scope of the invention as defined in the following claims.

What is claimed is:

1. In an apparatus for making fiber glass tubes a cylindrical form mounted for rotation about the longitudinal axis of the form, means to rotate the form, a carriage having a tubular projection extending into the form, a supply of fiber glass strand material on the carriage outside of the form, a fiber glass strand chopping means mounted on said tubular projection within the form, means to feed said glass strand material through said chopping means and means to reciprocate said chopping means and form relative to each other during the rotation of the form whereby the fiber glass in strand form is chopped and deposited on the inner wall of the form and held against said wall by centrifugal force.

2. In an apparatus for making fiber glass tubes, a cylindrical mandrel mounted for rotation about the longitudinal axis of the mandrel, means [for] *to* rotate the mandrel, a reciprocating carriage having a tubular projection telescoped within the mandrel, a supply of fiber glass strand material on the carriage, a fiber glass strand chopping means mounted on said tubular projection within the mandrel, means to advance said fiber glass in strand form through said chopping means and means to reciprocate the carriage and mandrel relative to each other during the rotation of the mandrel whereby the fiber glass in strand form is chopped and falls by gravity on the inner wall of the mandrel and is maintained on said wall by centrifugal force.

3. Apparatus for forming fiber glass tubes comprising a mandrel support, bearings at each end of said mandrel support, a rotatable mandrel mounted for rotation in said bearings between said bearings, said mandrel having an open end and a closed end, a carriage mounted for reciprocation toward and away from the mandrel, a projection extending from the carriage into the mandrel, a supply of fiber glass in strand form on the carriage and means to guide said fiber glass strand to the carriage projection within the mandrel, fiber glass chopping means on said last-named projection within the mandrel, means to drive said fiber glass chopping means and rotate the mandrel, means to reciprocate said carriage toward and away from the mandrel along the central axis of the mandrel whereby fiber glass in chopped form is evenly distributed along the interior of the mandrel, means to introduce resin within the mandrel and means to heat the mandrel whereby chopped fibers and resin are cured in cylindrical form within the mandrel.

4. Apparatus for forming fiber glass tubes comprising a mandrel support, bearings at each end of said support, a rotatable mandrel having a closed end mounted for rotation in one of said bearings and an open end mounted for rotation in the other of said bearings, a carriage mounted for reciprocation toward and away from the open end of the mandrel, a projection extending from the carriage into the open end of the mandrel, a supply of fiber glass in strand form carried by the carriage and means to guide said fiber glass strand to the free end of said projection within the mandrel, fiber glass chopping means on said free end of said projection within the mandrel, means to drive said fiber glass chopping means, means to rotate the mandrel, reversing motor means to reciprocate said carriage toward and away from the mandrel along the central axis of the mandrel whereby fiber glass in chopped form drops by gravity on the interior wall of the mandrel and is evenly distributed along the interior of the mandrel, means to spray resin within the mandrel and means to heat the mandrel whereby chopped fibers and resin are cured within the mandrel.

5. Apparatus for forming fiber glass tubes comprising a cylindrical mandrel closed at one end and open at the other end, means for rotating the mandrel about its longitudinal axis, a reciprocating carriage having an extension extending into the open end of the mandrel, fiber glass chopping means on the said carriage extension within the mandrel, means for passing fiber glass in strand form to said chopping means to be deposited in chopped form on the inside of said mandrel, a rack fixed to the carriage, a reversible motor having a pinion engaged with said rack for moving said carriage extension lengthwise within the mandrel, a lug on said carriage, a pair of longitudinally spaced switches in the path of said lug, a reversing relay, electrical circuit means connecting said switches and relay and motor to reverse the motor at each end of the carriage reciprocation in response to the lug striking the corresponding one of said switches, a supply of liquid resin, means for conducting resin from said supply to the interior of the mandrel and for depositing the resin onto the chopped fiber glass strands while the mandrel is rotated, and heating means adjacent the exterior of the mandrel to cure the resin and fiber glass on the inside of the mandrel.

6. Apparatus for forming fiber glass tubes comprising a cylindrical mandrel closed at one end and open at the other end, means for rotating the mandrel about its longitudinal axis, a reciprocating carriage in alignment with the open end of the mandrel, a tube on the carriage extending into the open end of the mandrel, fiber glass chopping means on the end of said tube within the mandrel, means for passing fiber glass in strand form to said chopping means to be deposited in chopped form on the inside of said mandrel, said carriage having a rack extending therefrom lengthwise of the mandrel, a reversible motor having a pinion engaged with said rack for driving said tube on the carriage lengthwise within the mandrel, a lug on the carriage, a pair of longitudinally spaced switches adapted to be engaged alternately by said lug at each end of the carriage reciprocation, a reversing relay, electrical circuit means connecting said switches and relay and motor to reverse the motor at each end of the carriage reciprocation, a supply of bonding liquid, flexible means for conducting liquid from said supply to the interior of the mandrel and for depositing the bonding liquid on the chopped fiber glass while the mandrel is rotated and the carriage is reciprocated to move said tube back and forth lengthwise within the mandrel.

7. A machine for making fiber glass tubes comprising a hollow cylindrical mandrel mounted for rotataion about the longitudinal axis of the mandrel, means inside the mandrel movable along the length of the mandrel during its rotation, said means including fiber glass chopping means, means for passing fiber glass in continuous strand form to said chopping means to be deposited by gravity in chopped form on the interior wall of the mandrel and to be held against said interior wall of the mandrel by centrifugal force due to the rotation of the mandrel, means for depositing thermo-setting resin onto said chopped fibers on the inside of the mandrel during the mandrel rotation and heating means at the outside of the mandrel for curing the resin and chopped fibers on the inside of the mandrel.

8. Tube making apparatus comprising a hollow cylindrical mandrel mounted for rotation about the longitudinal axis of the mandrel, means operable to traverse the length of the mandrel on the interior thereof during its rotation, said means including fiber chopping means, means for passing fiber glass in continuous strand form to said chopping means to be deposited by gravity in chopped form on the inside of the mandrel and to be compacted against the interior wall of the mandrel by centrifugal force due to the rotation of the mandrel, means for introducing a bonding material onto said chopped fibers at the inside of the mandrel and heating means at the outside of the mandrel for curing said bonding material and chopped fibers on the inside of the mandrel.

9. Apparatus for forming fiber glass tubes comprising a mandrel base, a first journal support extending upwardly from one end of said base, a second journal support at the other end of said base, a mandrel supported between said journal supports, said mandrel having a closed end and a trunnion centrally of said closed end mounted in said first journal support, the other end of said mandrel having a tubular portion secured thereto and said tubular portion being supported in said second journal support, a carriage platform mounted in alignment with said mandrel base, a reciprocating carriage on said platform, a tubular extension carried by the carriage and extending into the open end of said mandrel, the free end of said tubular extension having fiber glass chopping means carried thereby, a shaft extending through said tubular extension, a motor on the carriage connected to said shaft at one end and the other end of said shaft being connected to said fiber glass chopping means to drive the same, a supply of fiber glass in strand form mounted on said carriage, means to guide said strand along the tubular extension and feed the same into said fiber glass chopping means to be deposited in chopped form on the inside of the mandrel, a rack carried by the carriage, a reversing motor having a pinion engaging said rack, limit switch and circuit means connected to said motor for reversing the motor at each end of the carriage reciprocation, means to introduce resin to the interior of the mandrel during the rotation of the mandrel, and means to heat the mandrel to cure the chopped fiber glass and resin deposited upon the interior wall of the mandrel.

10. Apparatus for forming fiber glass tubes comprising a mandrel base, a first journal support extending upwardly from one end of said base, a second journal support at the other end of said base, a cylindrical mandrel supported between said journal supports, said mandrel having a closed end provided with means mounted in said first journal support, the other end of said mandrel being open and having a tubular portion secured thereto, said tubular portion being supported in said second journal support, a carriage platform mounted in alignment with said mandrel support, a reciprocating carriage on said platform, a tubular extension carried by the carriage and extending into the open end of said mandrel, the free end of said tubular extension having fiber glass depositing means carried thereby, a shaft extending through said tubular extension, a motor on the carriage connected to said shaft at one end and the other end of said shaft being connected to said fiber glass depositing means, a supply of fiber glass in strand form mounted on said carriage, and means to guide said fiber glass strand along the tubular extension and feed the same into said fiber glass depositing means, a rack carried by the carriage, a reversing motor having a pinion engaging said rack, limit switch and circuit means connected to said motor to reverse the motor at each end of the carriage reciprocation, means to introduce resin to the interior of the mandrel, and means to heat the mandrel to cure the fiber glass and resin deposited upon the interior wall of the mandrel.

11. That method of making a fiber glass tube which comprises rotating a horizontally disposed tubular form and at the same time introducing chopped binder-coated glass fibers to the interior of the tubular form, introducing a solvent at the interior of said cylindrical form to dissolve the binder on said chopped glass fibers, heating the tubular form and rotating the same to drive off the vapor of said solvent, thereafter introducing resin at the interior of said cylindrical form while rotating the form and thereafter heating the cylindrical form to cure the resin and chopped fibers.

12. That method of forming a fiber glass tube which comprises rotating a horizontally disposed cylindrical form, introducing binder-fiber glass strand to the interior of the cylindrical form, chopping said strand into short lengths into the interior of the form and at the same time rotating the form to evenly deposit said short length fiber strands along the interior wall of the cylindrical form, introducing solvent to soften the binder on the short length fiber strands, thereafter introducing a thermo-setting resin to the interior of the form while it is being rotated and thereafter heating the cylindrical form to cure the resin and fiber glass against the interior wall of the form while the same is being rotated.

13. That method of forming a fiber glass tube which comprises rotating a horizontally disposed cylindrical form about the axis of said form, introducing glass fiber strand to the interior of the cylindrical form, chopping said strand into short lengths into the interior of the form and at the same time rotating the form to evenly deposit the short length fiber strands along the interior wall of the cylindrical form, introducing a thermo-setting resin to the interior of the form while it is being rotated and thereafter heating the cylindrical form to cure the resin and short length fiber strands against the interior wall of the form while the same is being rotated.

14. A method of forming a glass fiber tube which comprises the steps of rotating a horizontally disposed tubular form about its horizontal axis, at the inside of said form chopping glass fiber strand into short pieces and dropping said short glass fiber pieces solely by gravity fall onto the inside of said form at the bottom along the length of the form as the form rotates to distribute said glass fiber pieces evenly circumferentially over its interior due to the centrifugal force of its rotation, spraying liquid resin onto said glass fiber pieces at the inside of the form along the length of the form as the form rotates to bind said glass fiber pieces into a tubular body which is compacted by the centrifugal force of the form's rotation, and thereafter heating said compacted tubular body while the latter remains in the form.

*15. In an apparatus for making filament reinforced tubes, a tubular form mounted for rotation about the longitudinal axis of the form, means to rotate the form, a carriage having a projection extending into the form, a supply of reinforcing filament material outside of the*

*form, filament chopping means mounted on said carriage projection within the form, means to feed said filament material in strand form through said chopping means, and means to reciprocate the chopping means and form relative to each other during the rotation of the form whereby the chopped filaments are deposited on the inner wall of the form and held against said wall by centrifugal force.*

*16. Tube making apparatus comprising a hollow tubular mandrel mounted for rotation about the longitudinal axis of the mandrel, means operable to traverse the mandrel lengthwise on the interior thereof during its rotation, said means including filament chopping means, means for passing filament material in continuous strand form to said chopping means to be deposited by gravity in chopped form on the inside of the mandrel and to be compacted against the interior wall of the mandrel by centrifugal force due to the rotation of the mandrel, means for introducing a bonding material onto said chopped filaments at the inside of the mandrel, and heating means at the outside of the mandrel for curing said bonding material and chopped filaments on the inside of the mandrel.*

*17. Tube making apparatus comprising a hollow tubular mandrel mounted for rotation about the longitudinal axis of the mandrel, means operable to traverse the mandrel lengthwise on the interior thereof during its rotation, means for passing filament material in strand form to said last-mentioned means to be deposited by gravity on the inside of the mandrel and to be compacted against the interior wall of the mandrel by centrifugal force due to the rotation of the mandrel, means for introducing a bonding material onto said filament material at the inside of the mandrel, and heating means at the outside of the mandrel for curing said bonding material and filament material on the inside of the mandrel.*

*18. A method of forming a filament reinforced resin tube which comprises the steps of rotating a horizontally disposed tubular form about its horizontal axis, introducing a strand of reinforcing filament material into the interior of said form, chopping said strand into short lengths into the interior of the form and at the same time rotating the form to evenly deposit the short length strands along the interior wall of the form, introducing a thermosetting resin to the interior of the form while it is being rotated, and thereafter heating the form to cure the resin and the short length strands against the interior wall of the form while the same is being rotated.*

References Cited in the file of this patent or the original patent

UNITED STATES PATENTS

| | | |
|---|---|---|
| 2,552,599 | Stout | May 15, 1951 |
| 2,633,605 | Brucker | Apr. 7, 1953 |
| 2,659,107 | De Bell | Nov. 17, 1953 |
| 2,686,737 | Caroselli et al. | Aug. 17, 1954 |
| 2,739,917 | Schulze | Mar. 27, 1956 |
| 2,742,931 | De Ganahl | Apr. 24, 1956 |
| 2,773,287 | Stout | Dec. 11, 1956 |
| 2,785,442 | Boggs | Mar. 19, 1957 |
| 2,870,054 | Amos et al. | Jan. 20, 1959 |

FOREIGN PATENTS

| | | |
|---|---|---|
| 349,581 | Great Britain | May 22, 1931 |
| 712,939 | Great Britain | Aug. 4, 1954 |